(12) United States Patent
Pilling et al.

(10) Patent No.: US 10,596,483 B2
(45) Date of Patent: Mar. 24, 2020

(54) APERTURE LAYOUT FOR VAPOR-LIQUID CONTACT TRAY

(71) Applicant: Sulzer Chemtech AG, Winterthur (CH)

(72) Inventors: Mark W. Pilling, Jenks, OK (US); Sven Glüer, Zürich (CH); Peter Wilkinson, BT Amsterdam (NL); Ryan E. Anderson, Silverthorne, CO (US)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 16/399,246

(22) Filed: Apr. 30, 2019

(65) Prior Publication Data
US 2019/0255457 A1    Aug. 22, 2019

Related U.S. Application Data

(62) Division of application No. 15/538,025, filed as application No. PCT/EP2015/062855 on Jun. 9, 2015.

(60) Provisional application No. 62/096,122, filed on Dec. 23, 2014.

(51) Int. Cl.
*B01D 3/22* (2006.01)
*B01D 3/16* (2006.01)

(52) U.S. Cl.
CPC ............ *B01D 3/22* (2013.01); *B01D 3/163* (2013.01)

(58) Field of Classification Search
CPC .................................. B01D 3/163; B01D 3/22
USPC .......... 261/114.1, 114.2, 114.3, 114.4, 114.5
See application file for complete search history.

(56) References Cited

U.S. PATENT DOCUMENTS

| | | |
|---|---|---|
| 2,045,518 A | 6/1936 | Chatfield |
| 2,274,041 A | 2/1942 | Cook et al. |
| 2,903,251 A | 9/1959 | Thrift |
| 3,146,280 A | 8/1964 | Forgrieve |
| 4,174,363 A | 11/1979 | Bruckert |
| 4,750,975 A | 6/1988 | Parker et al. |
| 5,120,474 A | 6/1992 | Binkley et al. |
| 5,360,583 A | 11/1994 | Nutter |
| 5,453,222 A | 9/1995 | Lee et al. |
| 5,468,425 A | 11/1995 | Nutter |

(Continued)

FOREIGN PATENT DOCUMENTS

| | | |
|---|---|---|
| GB | 1020653 A | 2/1966 |
| JP | S51-120341 U | 9/1976 |

(Continued)

*Primary Examiner* — Charles S Bushey
(74) *Attorney, Agent, or Firm* — Larson & Anderson, LLC

(57) ABSTRACT

A vapor-liquid contact tray apparatus includes a tray having a plurality of apertures for passage of fluid through the tray. The apertures are arranged in a first group of three adjacent rows extending substantially parallel to a main liquid flow path of the tray. Apertures of the middle row are offset along the main liquid flow path on the tray from adjacent apertures of the other two rows to form a triangular pattern of adjacent apertures across the three adjacent rows. The apertures have a length and a width, each length is oriented substantially parallel to its row and each width is oriented substantially perpendicular to its row. Centers of adjacent apertures within each row are separated by a first spacing which is equal to or between 2.5 and 4.5 times the average length of the apertures in that row. Adjacent rows are separated by a second spacing which is equal to or between 1.5 and 2.5 times the average width of the apertures of the adjacent rows.

4 Claims, 8 Drawing Sheets

(56) References Cited

U.S. PATENT DOCUMENTS

| | | | |
|---|---|---|---|
| 5,547,617 A | 8/1996 | Lee et al. | |
| 5,975,504 A | 11/1999 | Nutter et al. | |
| 6,068,244 A * | 5/2000 | Burton | B01D 3/324 |
| | | | 261/114.4 |
| 6,214,174 B1 * | 4/2001 | Matsumoto | B01D 3/22 |
| | | | 203/86 |
| 7,235,158 B2 * | 6/2007 | Matsumoto | B01D 3/22 |
| | | | 202/158 |
| 7,347,413 B2 * | 3/2008 | Diefenbacher | B01D 3/326 |
| | | | 261/114.1 |
| 7,540,476 B2 | 6/2009 | Pilling et al. | |
| 7,708,258 B2 | 5/2010 | Pilling et al. | |
| 7,810,796 B2 | 10/2010 | Xu et al. | |
| 8,066,264 B2 | 11/2011 | Griepsma et al. | |
| 8,720,870 B2 | 5/2014 | Pilling et al. | |
| 9,027,911 B2 * | 5/2015 | Lehner | B01D 3/163 |
| | | | 261/114.3 |
| 2003/0019737 A1 | 1/2003 | Matsumoto et al. | |
| 2004/0222077 A1 | 11/2004 | Yada et al. | |
| 2007/0040289 A1 | 2/2007 | Pilling et al. | |
| 2013/0099402 A1 | 4/2013 | Lehner et al. | |

FOREIGN PATENT DOCUMENTS

| | | |
|---|---|---|
| JP | H08-500292 A | 1/1996 |
| WO | 99/21435 A1 | 5/1990 |

* cited by examiner

US 10,596,483 B2

APERTURE LAYOUT FOR VAPOR-LIQUID CONTACT TRAY

BACKGROUND

Mass transfer columns, such as distillation, absorption, and stripping columns, have been provided with various types of trays for vapor-liquid contact purposes. These columns are well known in the art for separation of a multi-component feed stream(s) and are not particularly limited herein. Examples of such columns and trays are described in U.S. Pat. Nos. 4,750,975; 5,120,474; 5,453,222; and 8,066,264, which are incorporated herein by reference.

Typically, a mass transfer column has a plurality of trays horizontally supported in a spaced apart configuration over the height of the column. A typical tray has a deck over which liquid passes from an inlet downcomer section to an outlet downcomer. The typical tray deck has apertures through which ascending vapor may flow and over and/or around which liquid may flow in order to bubble or otherwise force vapor through liquid in cross-current flow.

Design of distillation columns and their associated trays is a balance of overall material throughput (e.g. capacity) and tray/column separation efficiency. Accordingly, it is an object of the invention to improve tray and column capacity without sacrificing, or in the alternative improving, efficiency.

The selection and layout of apertures for trays is guided in part by the above-outlined principles. However, vapor and/or liquid interaction between adjacent apertures on a tray and the effect on efficiency and capacity are not fully understood. U.S. Pat. Nos. 5,468,425 and 5,975,504, which are fully incorporated herein by reference for all purposes, describe aperture layouts and "required" aperture spacings for optimal performance of vapor-liquid contact trays. These patents show triangular patterns of apertures across rows of apertures on the tray and describe required spacings between apertures in the row and spacing between rows. These patents however fail to provide a correct understanding of the interactions between adjacent apertures on the tray and hence the "required" spacings between apertures do not provide optimal tray performance (e.g. capacity and/or efficiency). It is therefore strongly desired to obtain a better understanding of these interactions and provide aperture layouts and spacings which enhance tray performance.

It is further noted that trays are supported within columns by underlying tray supports. Underlying tray supports can interact with apertures in the tray to provide regions of dead space on the trays where there is reduced vapor/liquid interaction. It is therefore strongly desired to better understand these dead spaces on the tray and provide ways of increasing vapor/liquid interactions therein to enhance tray performance.

SUMMARY OF INVENTION

In a first aspect, the present invention provides a vapor-liquid contact tray apparatus comprising a tray having a plurality of apertures for passage of fluid through the tray, wherein:
the apertures are arranged in a first group of three adjacent rows extending substantially parallel to a main liquid flow path of the tray,
apertures of the middle row are offset along the main liquid flow path on the tray from adjacent apertures of the other two rows to form a triangular pattern of adjacent apertures across the three adjacent rows,
the apertures have a length and a width, each length is oriented along its row and each width is oriented substantially perpendicular to its row,
centers of adjacent apertures within each row are separated by a first spacing which is equal to or between 2.5 and 4.5 times the average length of the apertures in that row, and
adjacent rows are separated by a second spacing which is equal to or between 1.5 and 2.5 times the average width of the apertures of the adjacent rows.

In a second aspect, the present invention provides another vapor-liquid contact tray apparatus for use in a separation column. The apparatus comprises a tray and a tray support, wherein:
said tray support comprises one or more elements selected from the group consisting of: a ring, a partial ring, a bracket, or a flange underlying and supporting a circumferential region of the tray; a cross beam underlying and supporting a chordal region of the tray; and a tray panel forming a cross beam supporting a portion of an adjacent tray panel or panels of the tray;
a plurality of support-area-aeration apertures are formed in the tray laterally adjacent to the tray support;
one or more of the plurality of support-area-aeration apertures are at least partially covered by a cover, said cover positioned to interact with vapor passing through the support-area-aeration aperture such that greater than 50% of vapor passing through the support-area-aeration aperture is directed laterally across the tray and over an underlying tray support.

In a third aspect of the present invention, the present invention provides another vapor-liquid contact tray apparatus for use in a separation column. The apparatus includes all elements of the first and second aspects of the present invention.

In a fourth aspect, the present invention provides a fractionation column comprising one or more a vapor-liquid contact trays outlined in the any of the above-outlined aspects of the present invention.

In a fifth aspect, the present invention provides a method of producing an overhead stream and a bottom stream from one or more feed streams. The method comprising the steps of:
(i) introducing one or more feed streams to a mass transfer column according to the fourth aspect of the present invention, and
(ii) treating the mass transfer column under operating conditions sufficient to create a tops stream and a bottoms stream,
thereby producing an overhead stream and a bottoms stream from one or more feed streams.

DETAILED DESCRIPTION OF THE INVENTION

The present specification is based in part upon the present Inventors' first discovery of aperture layouts and configurations for separation trays which improve tray performance (e.g. increase capacity while maintaining or increasing efficiency). The present specification is also based in part upon the present Inventors' second discovery of aperture layouts and configurations for separation trays which provide aeration of portions of the tray located directly above an underlying tray support which also improves tray performance. While the Inventors' first and second discoveries can be used individually to improve tray performance, it is believed that the use of the combination of both the first and second discoveries together in the same tray can have cumulative benefits.

I. Aperture Layout

The Inventors' first discovery is that the lateral vapor streams exiting adjacent apertures and valves can impinge upon each other thereby creating high vapor momentum regions that limit tray capacity. The Inventors have unexpectedly found that the aperture and valve configurations of the trays of the present invention minimize and/or eliminate this impingement effect. In particular, the present Inventors have discovered an aperture layout for mass transfer column trays which increases tray capacity while maintaining or enhancing separation efficiency of the tray. In preferred embodiments the spacing between apertures is a function of the average sizing of the apertures. In other preferred embodiments, the spacing between apertures is a function of the type of apertures. Mass transfer columns containing one or more trays of the present invention can achieve higher capacities and equal or greater separation efficiencies than similar sized and designed columns which do not employ the trays of the present invention.

Figure 1:
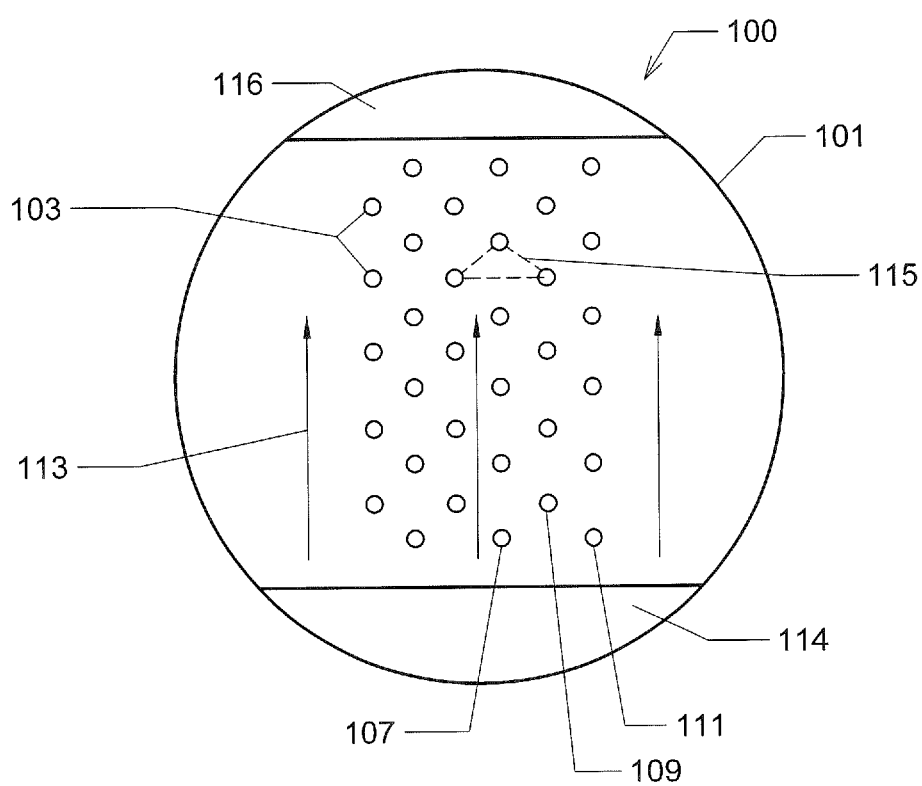
FIG. 1 is a top elevation view of a tray apparatus in accordance with the present invention.

Referring to FIG. 1, a vapor-liquid contact tray apparatus 100 comprises a tray 101 having a plurality of apertures 103 for passage of fluid through the tray 101. In some embodiments the tray 101 comprises separate panels (not shown) which can be fixed with one another to form the tray 101 (e.g. the tray deck).

The apertures 103 are arranged in a first group of three adjacent rows of apertures 107, 109, 111 which extend substantially parallel to a main liquid flow path 113 of the tray 101. The main liquid flow path 113 extends between an inlet downcomer section 114 and an outlet downcomer section 116 of the tray 101. In practice while there may be micro or regional liquid flow paths on the tray 101 caused by interaction of liquid, vapor, their associated overall and/or regional velocities, and/or features of the tray 101, the "main liquid flow path" 113 is the overall direction of liquid flow on the tray between an inlet downcomer section(s) 114 and an outlet downcomer section(s) 116. In certain embodiments the tray may have more than one inlet downcomer sections 114 and/or more than one outlet downcomer sections 116. In these embodiments, the tray can have more than one main liquid flow path 113, each of which extends between a respective inlet downcomer section 114 and a respective outlet downcomer section 116.

As noted above the tray apertures 103 are arranged in a first group of three adjacent rows of apertures 107, 109, 111 which extend substantially parallel to a main liquid flow path 113 of the tray 101. The term "substantially parallel" is herein understood to mean that a respective row or rows of apertures 103 are positioned about −15° to +15° relative to the main liquid flow path 113 of the tray, for example a respective row or rows of apertures 103 are positioned about −10° to +10° (e.g. about −5° to +5°, about −2° to +2°, or parallel (e.g. about 0°)) relative to the main liquid flow path 113 of the tray.

Apertures 103 of the middle row 109 are offset from adjacent apertures 103 of the other two adjacent rows 107, 111 along the main liquid flow path 113 on the tray 101 to form a triangular pattern 115 of adjacent apertures 103 across the three adjacent rows 107, 109, 111.

Figure 2:
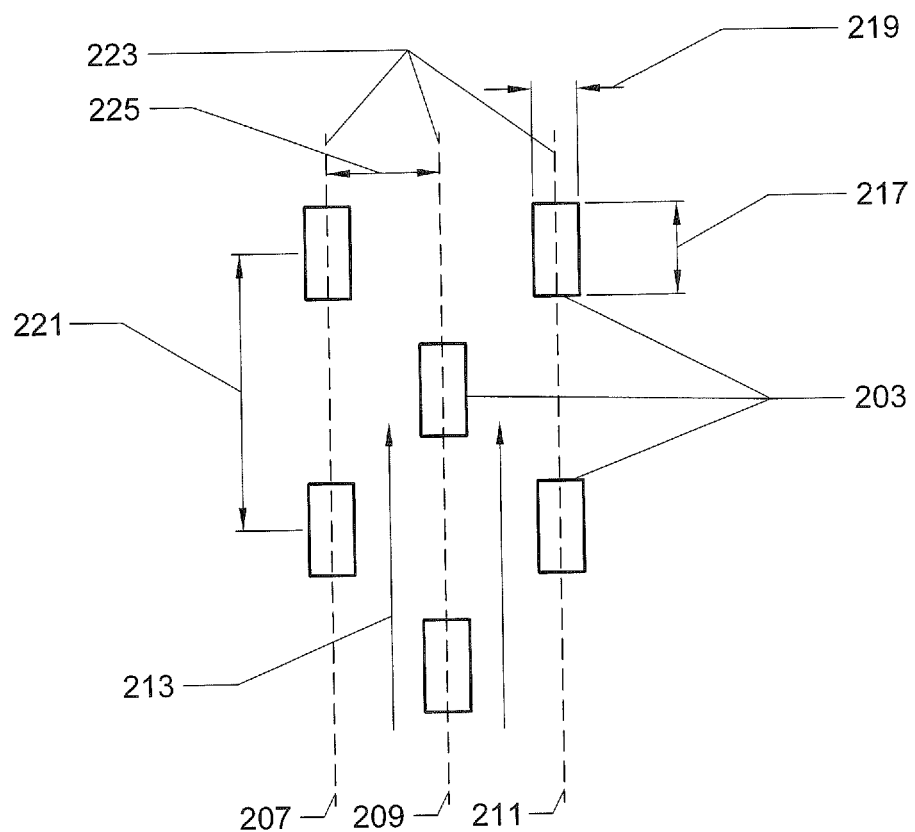
FIG. 2 is a top elevation view of a tray apparatus in accordance with the present invention.

Turning to FIG. 2 (e.g. a close up view of an aperture layout on a tray) the apertures 203 have a length 217 and a width 219. Each length 217 is oriented substantially parallel (e.g. on or along) its row 207, 209, 211 which is substantially parallel to the main liquid flow path 213 on the tray 201. Each width 219 is oriented substantially perpendicular to its row 207, 209, 211 (e.g. substantially perpendicular to the main liquid flow path 213 on the tray 201). Similar to above, the term "substantially" is throughout the application and is herein understood to mean within about −15° to +15°, about −10° to +10°, about −5° to +5°, more preferably between about −2° to +2°, or about 0° to the referenced direction (e.g. parallel or perpendicular).

Centers of adjacent apertures 203 within each row 207, 209, 211 are separated by a first spacing 221 which is equal to or between 2.5 and 4.5 times the average length 217 of the apertures 203 in that row 207, 209, 211. In more preferred embodiments, centers of adjacent apertures 203 within each row 207, 209, 211 are separated by a first spacing 221 which is equal to or between 2.9 and 3.9 times, for example between 3.5 and 3.7 (e.g. 3.6) times, the average length 217 of the apertures 203 in that row 207, 209, 211.

The center lines 223 of adjacent rows 207, 209, 211 are separated by a second spacing 225 which is equal to or between 1.5 and 2.5 times the average width 219 of the apertures 203 of the adjacent rows 207, 209, 211. In more preferred embodiments, the center lines 223 of adjacent rows 207, 209, 211 are separated by a second spacing 225 which is equal to or between 1.7 and 2.2 times, for example between 1.9 and 2.1 (e.g. 2.0) times, the average width 219 of the apertures 203 of the adjacent rows 207, 209, 211.

In preferred embodiments, centers of adjacent apertures 203 within each row 207, 209, 211 are separated by a first spacing 221 which is greater than 76 mm, for example equal to between about 95-130 mm. Furthermore, in these preferred embodiments the centerlines 223 of adjacent rows 207, 209, 211 are separated by a second spacing 225 which is equal to or less than 40 mm, for example equal to or between about 30-38 mm. In these preferred embodiments, the average length of the aperture is preferably equal to or between about 17 mm and 52 mm (e.g. equal to or between about 30-48 mm and more preferably equal to or between 40-47 mm) and/or the average width of the aperture is preferably equal to or between about 10 mm and 26 mm (e.g. equal to or between about 10-20 mm).

In other preferred embodiments, there is no overlap of apertures 203 between adjacent rows 207, 209, 211 along the main liquid flow path 213 of the tray. In other words, any line drawn perpendicular to the main liquid flow 213 path and through any two adjacent rows of apertures in the first group of three adjacent rows intersects at most one aperture 203 of the two adjacent rows.

In other preferred embodiments, in addition to the first group of three adjacent rows, other of the plurality of apertures are arranged in one or more additional groups of three adjacent rows extending parallel to a main liquid flow path of the tray (shown in FIG. 1). For Example, a tray may have 3, 4, 5, 6, 7, 8, 9, 10, 11, 12, 13, 14, 15, 16, 17, 18, 19, 20, or more rows of apertures which extend parallel to a main liquid flow path 113, 213 on the tray. The groupings of three adjacent rows can include common rows between groupings. For example, a tray with four rows of apertures can be considered to have two groupings of three adjacent rows (e.g. rows 1, 2, and 3 and/or rows 2, 3, and 4) etc.

Where the tray has one or more additional groups of three adjacent rows of apertures it is preferred that the groupings have characteristics similar to, or the same as the first grouping. In particular it is preferred that apertures of the middle row of the one or more additional groups are offset along the main liquid flow path on the tray from adjacent apertures of the other two rows in the group to form a triangular pattern of adjacent apertures across the three adjacent rows in the one or more additional groups. Furthermore, the apertures in the one or more additional groups have a length and a width, each length is oriented along its row and each width is oriented perpendicular to its row. Also it is preferred that centers of adjacent apertures within each row in the one or more additional groups are separated by a first spacing which is equal to or between 2.5 and 4.5 times the average length of the apertures in that row, and adjacent rows in the one or more additional groups are separated by a second spacing which is equal to or between 1.5 and 2.5 times the average width of the apertures of the adjacent rows.

The apertures in the tray provide a flow path for vapor to pass upward through the tray and through liquid traveling along the main liquid flow path of the tray. The size and shapes of the apertures of the tray are not particularly limited.

In certain embodiments the length of the aperture is positioned along or substantially parallel to the main liquid flow path on the tray while the width is positioned along or substantially perpendicular to the main liquid flow path. The average length of the aperture is preferably equal to or between about 10 mm and 70 mm (e.g. equal to or between about 17 mm and 52 mm, equal to or between about 30-48 mm, more preferably equal to or between 40-47 mm, for example 45 mm). In these embodiments the average width of the aperture is preferably equal to or between about 5 mm and 40 mm (e.g. equal to or between about 10 mm and 26 mm, equal to or between about 10-20 mm, for example 19 mm).

In other preferred embodiments the apertures will have a shape selected from the group consisting of: circular, square, rectangular, trapezoidal, pentagonal, and hexagonal. In other preferred embodiments one or more of, or all of, the apertures are trapezoidal and are positioned such that their parallel sides are substantially perpendicular to the main liquid flow path of the tray (e.g. where the longer parallel side is upstream of the shorter parallel side along the main liquid flow path). Since trapezoidal apertures have a long width upstream and a short width downstream along the main liquid flow path on the tray, the average width of the trapezoidal apertures can be used for determining their layout on the tray.

In other preferred embodiments one or more of, or all of, the apertures are rectangular and are positioned such that the long parallel sides are substantially parallel to the main liquid flow path while their short parallel sides are substantially perpendicular the main liquid flow path. The size and shape of apertures can also be preferably selected to control and/or minimize liquid flow through the tray deck (e.g. weeping of liquid from the main liquid flow path of the tray through the tray to a lower position in a column/tower).

The apertures may be associated with a cover which at least partially covers the aperture. Where an aperture cover is present it is preferably selected to control weeping, vapor flow rate, vapor direction, liquid flow rate and direction, and/or vapor introduction/dispersion or contact with the liquid traveling along the main liquid flow path of the tray.

Aperture covers are well known in the art and not particular limited herein. In preferred embodiments, an aperture cover or covers are present which at least partially cover one or more apertures (e.g. all apertures of the tray). Apertures and their associated covers, if present, are known in the art as "valves" and the covers can be inserted into and/or associated with the aperture after formation of the aperture or in the alternative formed from the tray deck when forming the aperture (e.g. by punching and/or bending). These valves may be fixed valves whose covers remain fixed with respect to the tray deck or floating valves whose covers variably open and close with respect to the tray deck depending upon vapor flow rates and liquid levels.

Non-limiting examples of valves are described in U.S. Pat. Nos. 7,540,476, 7,708,258, 8,066,264 and 8,720,870, which are incorporated herein by reference for all purposes. In a preferred embodiment the tray comprises one or more valves described in these patents. In other preferred embodiments the tray will comprise one or more valves selected from the group consisting of a VG-O MINIVALVE™ (Koch-Glitsch), PROVALVE™ (Koch-Glitsch), a standard round valve, an arc valve, and a bubble cap.

Figure 3:
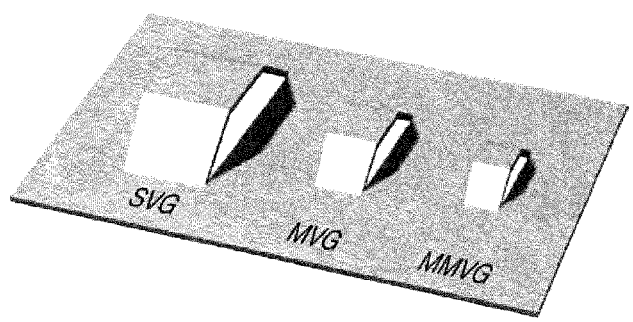
FIG. 3 is a perspective view of trapezoidal valves.

When one or more fixed valves are present they are preferably trapezoidal valves and are punched out from the tray deck and their lengths oriented parallel to the liquid flow. Trapezoidal valves provide unique advantages compared to other types of valves or uncovered apertures (e.g. sieve trays). In particular, they allow for lower froth height, less entrainment due to lateral vapor release, increased capacity, improved turndown, high efficiency over a wide operating range through improved vapor-liquid contact, superior mechanical strength by increased stiffness of tray deck, no moving parts and therefore no wear, and excellent fouling resistance. Some trapezoidal valves are shown in FIG. 3.

When one or more floating valves are present they preferably include movable or floating valve which maximizes the hydraulic capacity, the separation efficiency, and the operating range of fractionation trays. The main characteristics of a these valves include an umbrella or concave shaped cover to reduce the jetting momentum of the released vapor, minimize entrainment vapor-liquid entrainment, promote uniform mixing of the vapor and liquid on the tray deck, maximize the contact area of vapor and liquid on the tray deck. Two wide legs movably fix this type of valve to the tray deck and serve to maximize the robustness, to prevent spinning, wearing, and the valve from popping out from the tray deck, and maximize run length and minimize maintenance cost. Four spacers are further included to prevent sticking to the tray deck and maximize fouling resistance. Two thicknesses and lifts are provided to maximize flexibility and operating range. The valve orientation is parallel to the liquid flow which serves to minimize the hydraulic gradient along with the flow path of the tray deck.

It is further noted that fixed or movable valves having an umbrella or concave shaped cover can create further desired vapor flow profiles. For example the umbrella or concave shaped cover can serve to direct vapor in a outward yet downward vector (toward the tray deck) away from the aperture. For example vapor leaving the aperture interacts with the concave or umbrella shaped cover and is redirected radially outward away from aperture and then back toward the tray deck away from the aperture (e.g. at an oblique angle back toward the tray deck and away from the aperture). The resultant vapor flow through these types of valves allows the momentum of vapor exiting the valve to carry the vapor outward away from the valve and downward (e.g. at an oblique angle back toward the tray deck and away from the aperture) through liquid traveling along the tray deck. Without being bound by a particular mechanism of operation, this is believed to allow for greater aeration of the liquid as well as the ability to aerate a greater area of the tray with the use of these types of valves.

II. Tray Support and Aeration of Liquid Flow on Tray Directly Above Support

Trays are typically supported within a column by a tray support which is affixed to the column and underlies and supports the tray and/or one or more of its individual panels. The regions of the tray directly overlying the tray support typically do not have apertures and thus the liquid flow path above tray supports are typically not aerated. In the alternative, these regions of the tray do have apertures but vapor flow through the apertures is blocked by the underlying tray support. In either event, these regions non-aerated regions are typically considered "dead" (e.g. non-aerated) regions.

The present Inventors have found that when these typically non-aerated regions of the tray are aerated, pressure drop across a tray can be reduced/minimized while increasing tray capacity. Thus, in a further aspect of the present invention, the tray apparatuses described herein may further comprise: a tray support, wherein the tray is supported by the tray support; and structures capable of (e.g. means for) aerating at least a portion of the main liquid flow path directly above the tray support. Where these structures for aerating at least a portion of the main liquid flow path directly above the tray support are employed, it is preferred that they are sufficient to aerate a portion (e.g. 25% or more, 50% or more, 75% or more, or all) of the liquid flow path directly above the tray support.

Tray supports and their associated elements are well known in the art and are not particularly limited herein. For example, tray supports and their associated elements can include, inter alia: rings, partial rings, brackets, and/or flanges affixed to the column which underlie and support a circumferential region of the tray; cross beams (e.g. a truss system) affixed to the column which underlie and support chordal regions of the tray; and/or an integrated truss system which makes use of one or more tray panels to support other panels of the tray (e.g. a tray panel forming a cross beam underlying and supporting a portion of an adjacent tray panel or panels); and combinations thereof.

The structures capable of aerating at least a portion of the main liquid flow path directly above the tray support are likewise not particularly limited. In certain embodiments said structures include elements/features associated with the tray including support-area aeration apertures formed in the tray directly above the tray support.

In the embodiments where the tray includes support-area aeration apertures formed in the tray directly above the tray support, corresponding elements/features are preferably associated with the tray support which allow fluid communication from below the tray and through the support-area-aeration apertures above the tray support. In one embodiment these corresponding element/features associated with the tray support include apertures in the tray support which are in fluid communication with the support-area aeration apertures in the tray directly above the tray support. U.S. Pat. Nos. 2,274,041, 2,903,251, 4,174,363, 5,547,617, and 7,810,796 which are incorporated herein for all purposes, describe further corresponding element/features associated with the tray support which allow fluid communication from below the tray through the support-area aeration apertures above the tray support. For Example U.S. Pat. No. 7,810,796 describes use of a spacer(s) disposed between the tray and the tray support. In these embodiments the spacer(s) serve to lift the tray from the support thereby allowing fluid communication from below the tray through the support-area aeration apertures disposed directly above the tray support. These patents further describe embodiments which are incorporated herein for all purposes which provide aeration to liquid on trays directly above the tray support.

Figure 6:
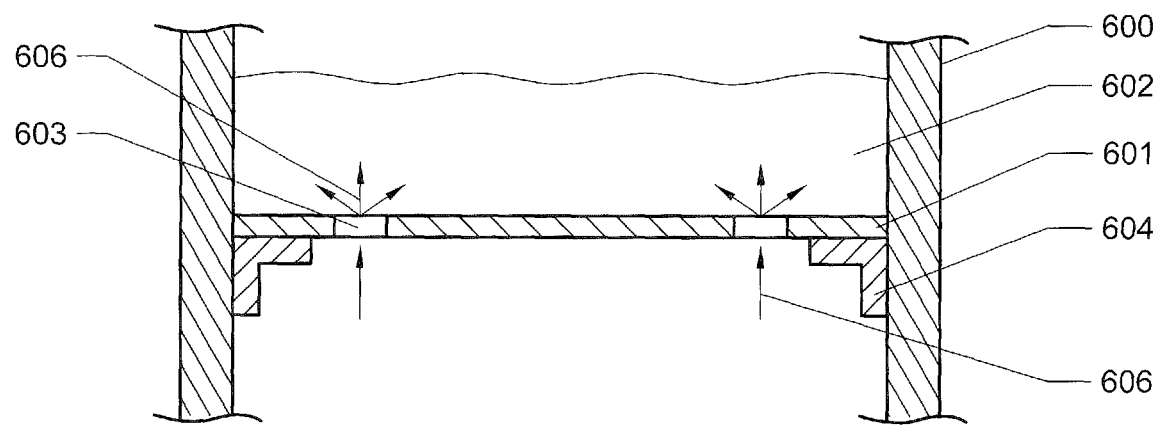
FIGS. 6-10 are side elevation cross section views of tray apparatuses in accordance with the present invention.

In yet additional embodiments, which are in part the subject of the Inventor's second discovery and shown in FIG. 6-10, the structures capable of aerating at least a portion of the liquid 602 directly above the tray support 604 include one or more support-area-aeration apertures 603 formed in the tray 601 and positioned adjacent (e.g. laterally, radially or horizontally) to the underlying tray support 604. As shown in FIG. 6, support-area-aeration apertures 603 are preferably positioned within about 5 mm, within about 2.5 mm, within about 1.5 mm, or less, adjacent to an underlying tray support 604. As described herein, embodiments of the Inventor's second discovery can be used alone or in connection with embodiments of the Inventor's first discovery described above. It is however believed that the use of the combination of both the first and second discoveries together in the same tray can have cumulative benefits in improving tray performance.

Where a support-area-aeration aperture(s) 603 is employed in a position that is laterally adjacent to the tray support it laterally deflects vapor 606 (e.g. radially or horizontally) outward along the tray deck to or directly over the adjacent tray support 604. A portion of this exiting vapor 606 travels within the liquid 602 in the direction of and to a position above underlying tray support 604, thereby aerating at least a portion of the liquid 602 directly above the tray support 604. In other embodiments, the aperture 603 is associated with a fixed or floating cover to aid in further directing vapor laterally outward across the tray deck. In preferred embodiments, and as described above, the fixed or floating cover will have an umbrella or concave shape which can create further desired vapor flow profiles. For example the umbrella or concave shaped cover can serve to direct vapor in a outward yet downward vector (toward the tray deck) away from the aperture. For example vapor leaving the support-area aeration aperture interacts with the concave or umbrella shaped cover and is redirected radially outward away from aperture and then back toward the tray deck away from the aperture (e.g. at an oblique angle back toward the tray deck and away from the aperture). The resultant vapor flow through these types of valves allows the momentum of vapor exiting the valve to carry the vapor outward away from the valve and downward (e.g. at an oblique angle back toward the tray deck and away from the support-area aperture) through liquid traveling along the tray deck. Without being bound by a particular mechanism of operation, this is believed to allow for greater aeration of the liquid above the tray support as well as the ability to aerate a greater area above the support.

In other preferred embodiments, the flow of vapor 606 exiting the support-area-aeration aperture 603 is biased in the direction of and over the adjacent tray support 604. In these embodiments it is preferred that greater than 50% (e.g. greater than 75%, or all) of the vapor passing through the support-area-aeration aperture is biased in the direction of and to a position overlying the adjacent underlying tray support.

Structures capable of (e.g. means for) biasing greater than 50% of the vapor 606 passing through the support-area aeration aperture flow exiting the support-area-aeration aperture 603 are not particularly limited herein. These structures however preferably include an aperture cover associated with the aperture 603. In preferred embodiments, the aperture cover has one or more openings positioned to direct greater than 50% of vapor passing through the support-area-aeration aperture in the direction of and to a position overlying the adjacent underlying tray support. The cover may optionally have additional openings positioned to direct vapor across other portions of the tray which are not directly above a tray support. The covers may be fixed with respect to the tray such that the opening(s) is fixed in an open position or they may be floating valves which have variable heights with respect to the tray deck during operation of the tray.

Figure 7:
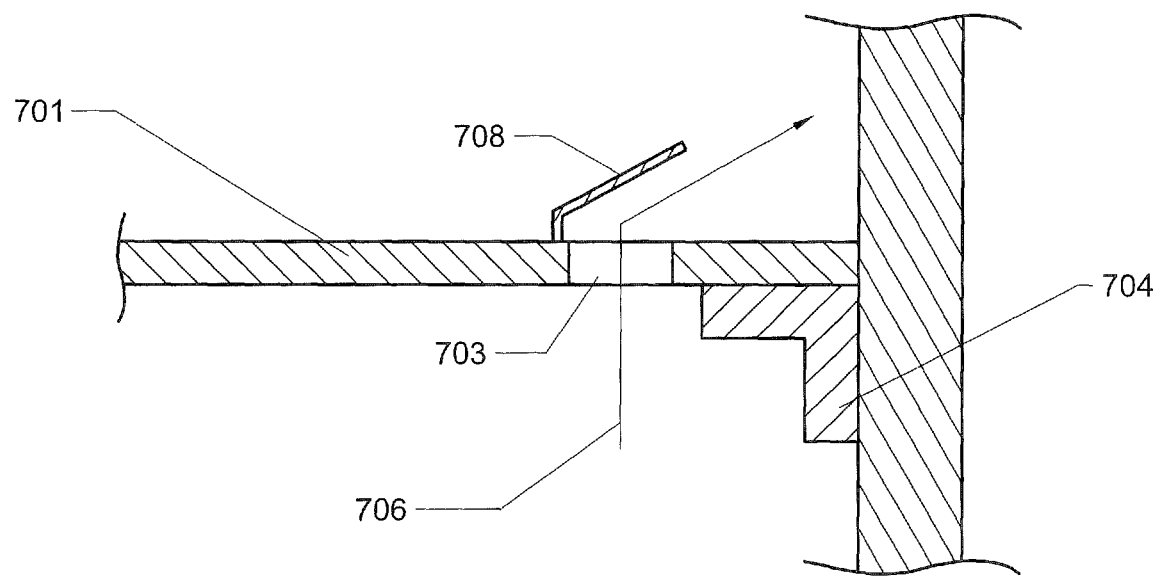

As shown in FIG. 7, in one embodiment it is envisioned that a fixed "push" cover 708 (e.g. a "push" valve) can be employed to bias vapor flow 706 from the support-area-aeration aperture(s) 603 over the underlying tray support 704. Fixed push covers or push valves are known in the art and are typically employed in separation trays to facilitate movement of liquid on the tray along the main liquid flow path of the tray (e.g. from the inlet downcomer section to the outlet downcomer section). In other words, push valves as used in the art include an aperture cover having a single opening which biases vapor in the direction of (e.g. parallel to) the main liquid flow path on the tray. Typically push valves are formed integral with the tray upon formation of the aperture, where a slit is made in the tray and subsequently deformed to provide an opening in the tray pointing in the direction of the main liquid flow path.

In the present embodiment, employment of a push valve to bias vapor flow over an underlying tray support is counterintuitive, and contrary, to how push valves are employed in the art. For example, where the support-area-aeration apertures 603 are located laterally adjacent to an underlying tray support ring, and/or a chordal tray support having cross beams/struts substantially parallel to the main liquid flow path of the tray, employment of a push valve in connection with a support-area-aeration aperture 603 would result in biasing of vapor flow in a direction different from the main liquid flow path on the tray (e.g. in a direction not parallel to the main liquid flow path on the tray). For example in these embodiments the vapor could be biased equal to or between 10 and 170 degrees to the main liquid flow path of the tray (e.g. perpendicular to or at an oblique angle to the main liquid flow path of the tray).

The aperture covers for the support-area-aeration aperture 603 may also be floating covers. In these embodiments, the cover is openable and closeable such that the height of the cover and its corresponding opening(s) are variable with respect to the tray deck depending upon vapor flow rate through the support-area-aeration aperture, liquid level on the tray, or both vapor flow rate through the support-area-aeration aperture and liquid level on the tray.

Figure 8:
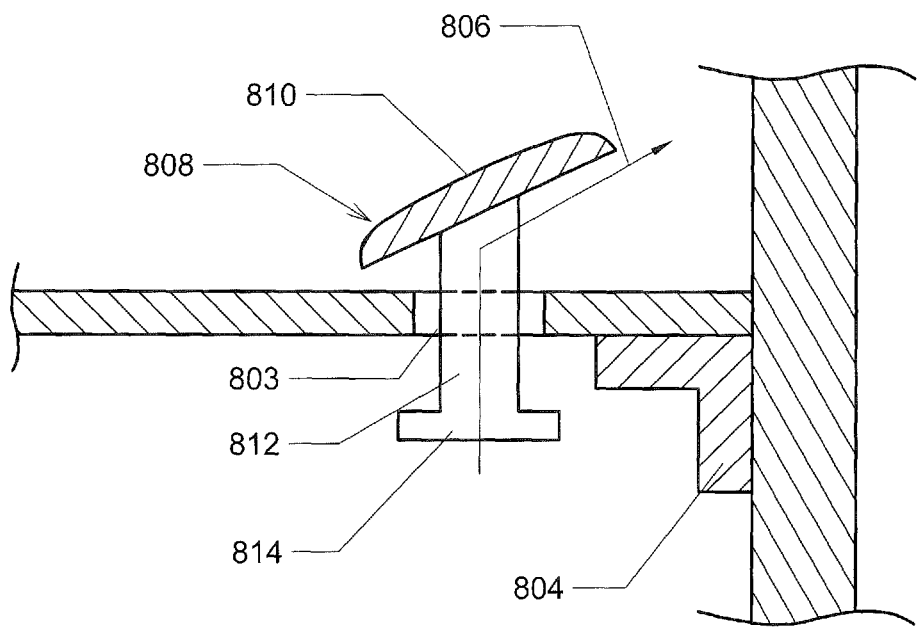

As shown in FIG. 8, the present Inventors have discovered a particularly preferred floating cover 808 for use with support-area-aeration aperture(s) 803. The cover 808 includes a concave canopy 810, one or more leg portions 812, and one or more feet portions 814. When the cover 808 is associated with the support-area-aeration aperture(s) 803 the concave canopy 810 faces the tray 801 and at least partially covers the support-area-aeration aperture 803. The one or more legs 812 are connected to the canopy 810 and are disposed through the support-area-aeration aperture 803. The one or more feet 814 are disposed under the tray 801 and interact with the underside of the tray 801 to prevent removal of the cover 808 from the tray 801 after its initial insertion. As the cover 808 moves from a closed to an open position the leg(s) 812 move within and interact with the support-area-aeration aperture 803 as the canopy 810 moves away from the tray 801. As the canopy 808 moves away from the tray 801 it tilts to an oblique angle with respect to the tray 801 exposing an opening pointing in the direction of an underlying tray support 804. As the canopy 810 moves further away from the tray deck 801, the opening pointing in the direction of the underlying adjacent tray support 804 grows larger, thereby biasing more vapor flow 806 in the direction of and to a position above the tray support 804. The canopy 810 can continue to move away from the tray 801, and can preferably continue to tilt, until the feet 814 disposed under the tray 801 become engaged with the underside of the tray 801 when the cover 808 is in a fully open or fully tilted position.

Similar to the above discussion regarding the use of fixed or floating valves having umbrella or concave shaped canopies, use of an umbrella or concave shaped canopies with the present tilting valve can create a preferred vapor flow profile which biases vapor over the adjacent underlying tray support. Here vapor flow interacts with the cover to raise the cover from the tray deck. As vapor interacts with the umbrella or concave shaped canopy, the direction of vapor flow is transitioned from vertically away from the tray deck to horizontally along the tray deck and over an adjacent support. In certain embodiments, the umbrella or concave shaped canopy can be provided such that some of the vapor is redirected at an oblique angle back toward the tray deck away from the corresponding support-area aeration apertures but still in the direction of the underlying adjacent tray area support. In other embodiments, a portion (e.g. less than 50%) of the vapor passing through the support-area aeration apertures can be allowed to pass through other apertures in the cover 808 which do not result in aeration of liquid above the adjacent tray support.

Figure 9:
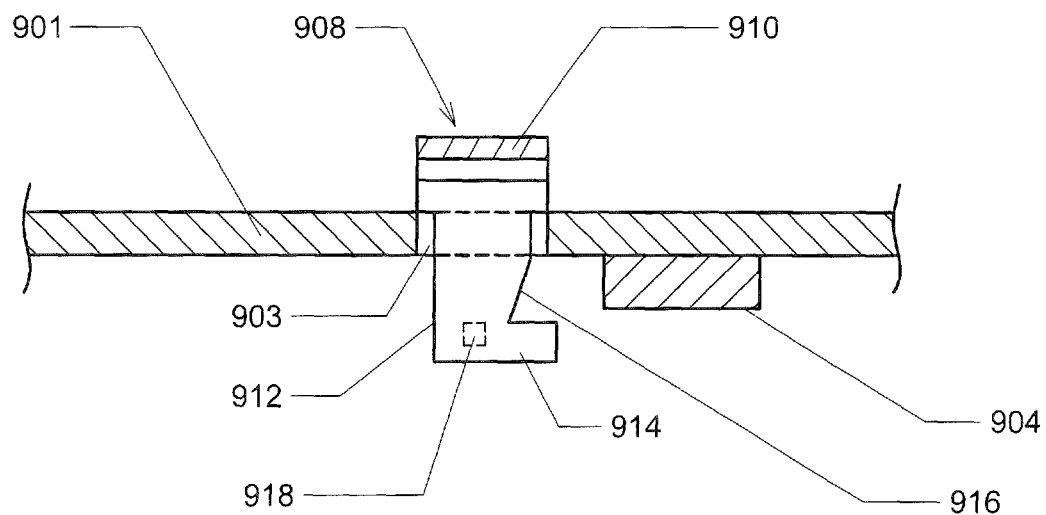
Figure 10:
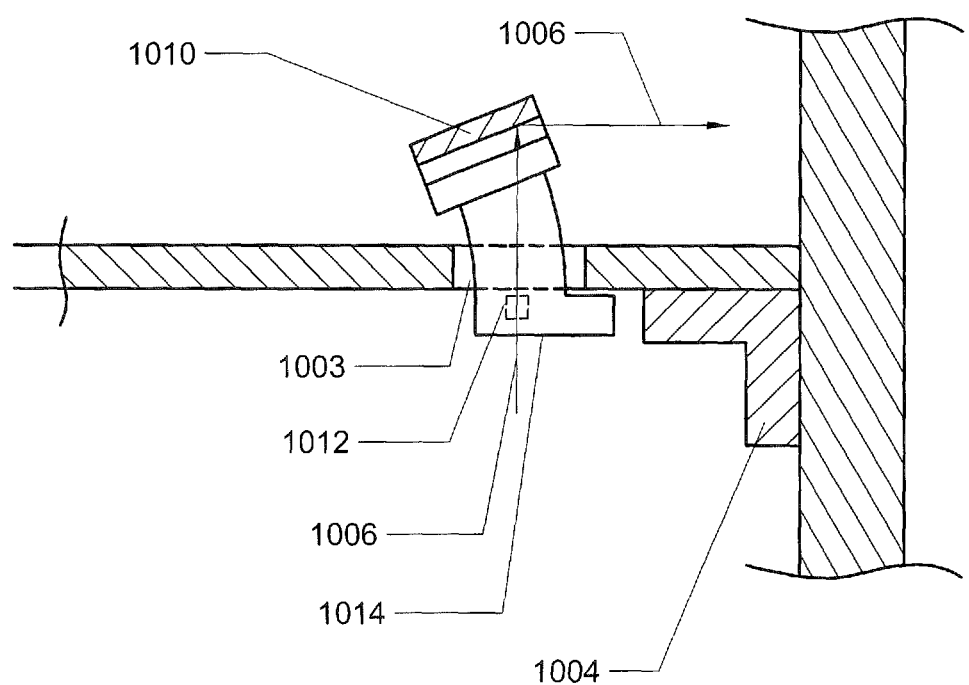

The tiltability of the cover 808 is preferably provided by physical interaction between the leg(s) 812 of the cover 808 and the support-area-aeration aperture 803 of the tray 801. In this embodiment, and as shown in FIGS. 9 and 10 (which respectively show a valve in the closed and open positions), the leg(s) 912, 1012 can be tapered (as shown in FIG. 9) or rockered (as shown in FIG. 10), between the canopy 910, 1010 and the one or more feet 914, 1014. For example where the leg(s) 912 are tapered or have a tapered portion, the leg(s) 912 has a larger width located toward the canopy 910 as compared to a smaller width located toward the one or more feet 914. This feature allows the leg(s) 912 to interact with the aperture 903 as the cover 908 opens and allows the canopy 910 to tilt with respect to the tray 901 upon opening of the cover 908. In further example where the leg(s) 1012 are rockered or have a rockered portion, the leg(s) 1012 can have a constant width between the canopy and the one or more feet 1014. In this embodiment the leg(s) 1012 have an arcuate shape, or are otherwise rockered, wherein interaction between the rockered/arcuate leg(s) and the support-area aeration aperture 1003 allows the canopy to tilt with respect to the tray upon opening of the cover. Again, in these embodiments the canopy actively bias vapor flow 1006 toward and to a position which is over the laterally adjacent underlying tray support 1004.

Also, as shown in FIG. 9, one or more of the legs 912, and/or one or more of the feet 914, may have a structure such as a flange, bump, or protrusion 918 which can further interact with the underside of the tray 901 to resist removal of the cover 908 after it is inserted in the aperture 903. The flange, bump, or protrusion 918 may be provided after insertion of the legs 912 and feet 914 through the aperture 903 as a final step of cover assembly. In some embodiments when the cover 908 has more than one leg 912 (e.g. two legs 912) and/or more than one foot 914 (e.g. two feet 914), the corresponding flange, bump, or protrusion 918 can be formed on only one of the legs 912 or on only one of the feet 914. In this embodiment, the corresponding leg and/or foot would be asymmetrical to the other of the leg and/or foot and would further prevent removal of the cover 908 after insertion into the aperture 903. This feature would likewise facilitate manufacture and/or assembly of the tray as the corresponding flange, bump, or protrusion 918 could be used to guide proper alignment of the cover 908 in the corresponding aperture such that the cover 908 tilts in the proper direction (e.g. away from the underlying support 904) to ensure proper biasing of vapor over the underlying support. In other embodiments, the structure (e.g. bump, flange, protrusion, etc) which can resist removal of the cover 908 after it is inserted in the aperture is formed in the cover prior to insertion into the aperture. In this embodiment, the leg(s) can have sufficient elasticity to allow slight bending of the leg(s) for insertion into the aperture and passage of the structure (e.g. bump, flange, protrusion, etc.) and subsequently allow for the leg to regain its original shape after insertion.

III. Mass Transfer Columns and Methods of Operation

The contact tray apparatuses of the present invention are intended for use in mass transfer columns. Hence in a further aspect, the present invention provides a mass transfer column comprising one or more contact tray apparatuses according to any herein described embodiment.

The tray(s) are arranged horizontally in a spaced apart configuration along the height of the column so that liquid enters the tray at an inlet downcomer section(s) from higher in the column and exits the tray at its outlet downcomer to a position lower in the column. In preferred embodiments the column will have a plurality of horizontally disposed contact trays wherein 5% or more, 15% or more, 25%, or more, 50% or more, 75% or more, or all of the trays within the column include a tray apparatus according to any herein described embodiment.

In another embodiment, an existing conventional mass transfer column can be retrofit to include one or more tray apparatuses according to any embodiment described herein. The decision to retrofit an existing column can be made to increase capacity of the column without having to incur the cost of entire column design and replacement.

The present invention also provides a method of producing an overhead stream and a bottoms stream from one or more feed streams. Other streams such as side product stream(s) or secondary feed streams can be provide to or removed from the column. The method includes a first step of introducing one or more feed streams to a mass transfer column having a horizontally disposed tray apparatus according to any embodiment herein described. A second step includes, treating the one or more feed streams under operating conditions within the column sufficient to create an overhead stream and a bottoms stream. Operation of mass transfer columns is well known in the art and operating conditions are not particularly limited. In a further embodiment, the horizontally disposed tray apparatus includes one or more support-area aeration apertures that is positioned laterally adjacent to an underlying tray support. In this further embodiment, the method can further comprise the step of directing greater than 50% of the vapor passing through this support-area aeration aperture laterally across the tray and to a position over the tray support.

IV. Increase in Tray Capacity and Efficiency and Decrease in Vapor-Side Pressure Drop Across the Tray The present Inventors have discovered that tray operating capacity can be increased while maintaining or improving tray efficiency and while maintaining or reducing pressure drop through the tray. These attributes can be achieved by employing: the aperture layouts herein described; the ways of aerating the liquid flow path of the tray above tray support(s) herein described; or the combination of both.

In some embodiments the operating capacity of the tray can be increased by 5% or more, 10% or more, 15% or more, or 20% or more over trays not including these features. In other embodiments the operating capacity of the tray is increased by 5% to 25% without reduction in tray efficiency.

In yet other embodiments the vapor side pressure drop through the tray can be decreased by 5% or more, 10% or more, 15% or more, or 20% or more over trays not having these features without reduction in tray efficiency. In other embodiments vapor side pressure drop through the tray is reduced by 5% to 25% without reduction in tray efficiency.

In yet further embodiments, as gas load of the tray is increased the trays of the present invention demonstrate an increase in tray separation efficiency of 5% or more, 10% or more, 15% or more, or 20% or more over trays not having these features.

Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner with any other of the various embodiments.

V. Examples

Having described the invention in detail, the following examples are provided. The examples should not be considered as limiting the scope of the invention, but merely as illustrative and representative thereof.

Three trays (e.g. decks) having different aperture configurations and optionally means for aerating liquid flow path above the tray support are studied under identical conditions in a test setting (Baseline Deck, Deck I, and Deck II). The baseline deck is herein considered to be a comparative example, while Decks I and II are considered to be within the scope of the present invention.

The Baseline Deck is based upon common commercial recommendations for arrangement of apertures on a tray deck (e.g. commercial standards in place prior to the present invention). The baseline deck has a plurality of apertures for passage of fluid through the tray. The apertures are arranged in a first group of three adjacent rows extending parallel to a main liquid flow path of the tray. The apertures of the middle row are offset along the main liquid flow path on the tray from adjacent apertures of the other two rows to form a triangular pattern of adjacent apertures across the three adjacent rows. The apertures have a length and a width, each length is oriented along its row and each width is oriented perpendicular to its row. Centers of adjacent apertures within each row are separated by a first spacing which is less than 2.5 times the average length of the apertures in that row. Adjacent rows are separated by a second spacing which is greater than 2.5 times the average width of the apertures of the adjacent rows. The Baseline Deck is supported by a tray support and no aeration means are provided to aerate the liquid flow path on the deck directly above the tray support.

Deck I is similar to the baseline deck. The first difference between Deck I and the Baseline Deck is that centers of adjacent apertures within each row are separated by a first spacing which is equal to or between 2.5 and 4.5 times the average length of the apertures in that row. The second difference between Deck I and the Baseline Deck is that adjacent rows are separated by a second spacing which is equal to or between 1.5 and 2.5 times the average width of the apertures of the adjacent rows. Like the Baseline Deck, Deck I is supported by a tray support and no aeration means are provided to aerate the liquid flow path on the deck directly above the tray support.

Deck II is similar to Decks I and contains the same differences as Deck I as compared to the Baseline deck. Deck II however includes another difference in that Deck II was supported by a supporting tray ring having apertures in fluid communication with apertures in the tray overlying the ring. This fluid communication allows for aeration of the liquid flow path on the deck directly above the tray support. It is also noted, that similar results to the results of the test of Deck II were achieved in further testing where the tray was in direct contact with the supporting ring, however, tilting valves were placed in the tray adjacent (e.g. radially/laterally) to the supporting ring to direct and disperse vapor radial outward (e.g. radially) over the ring to aerate the liquid flow path on the tray above the ring.

Figure 4:
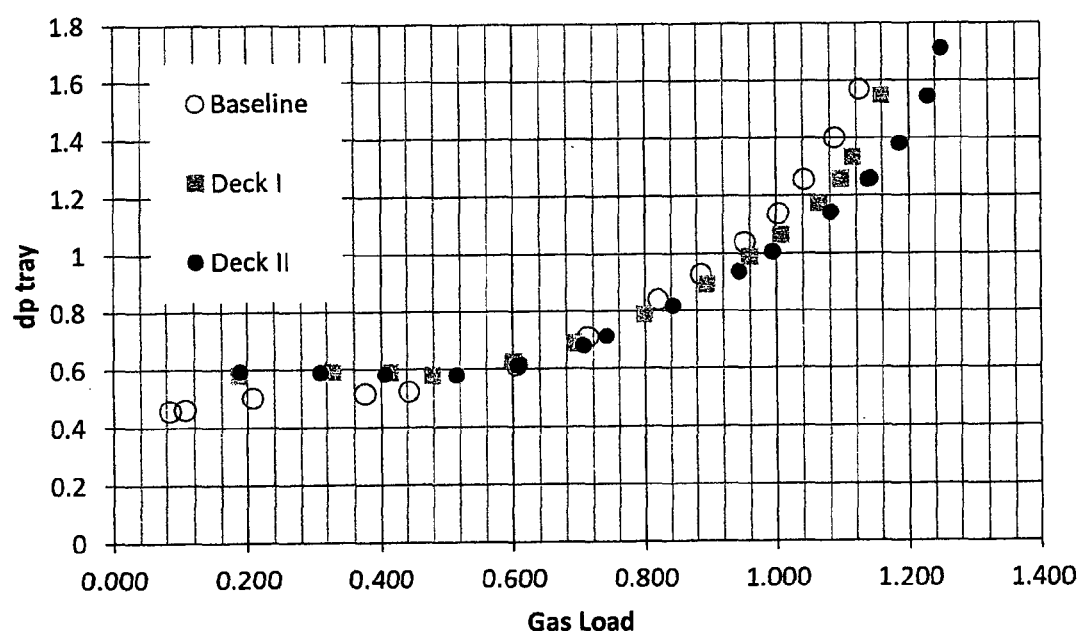
FIGS. 4 and 5 shows graphical results from the Example section.
Figure 5:
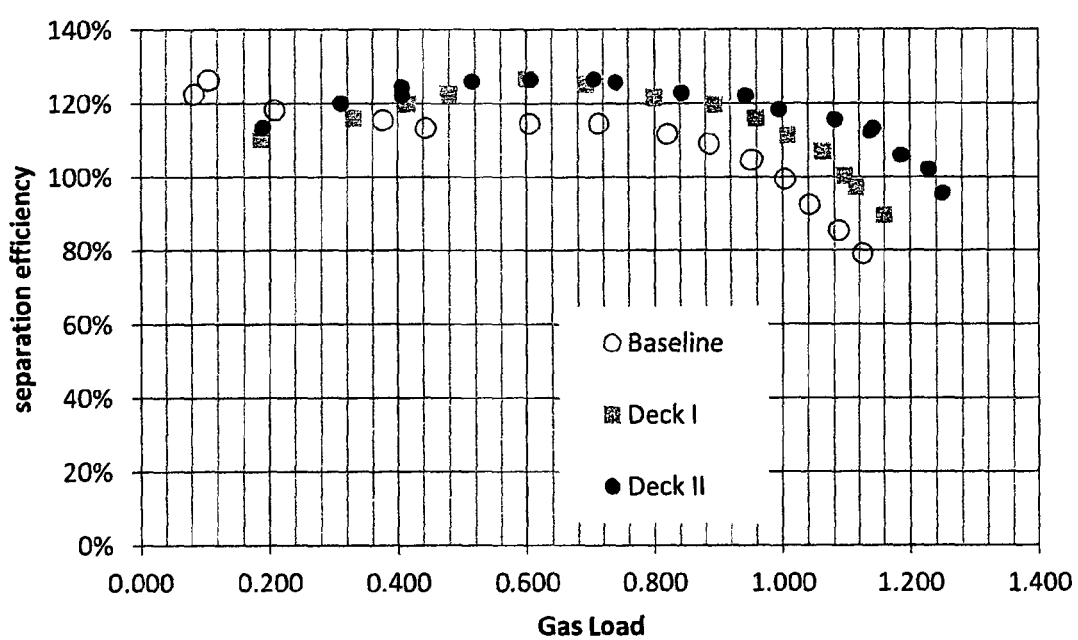

Graphical test results for the above four trays are plotted against each other in FIGS. 4 and 5. As can be seen in FIGS. 4 and 5, the trays of the present invention (Decks I and II) showing improved capacity, maintained and/or decreased vapor-side pressure loss, and maintained and/or increased tray separation efficiency as compared to the Baseline Deck.

The invention claimed is:

1. A vapor-liquid contact tray apparatus for use in a separation column, said apparatus comprising a tray and a tray support, wherein:
    said tray support comprises one or more elements selected from the group consisting of: a ring underlying and supporting a circumferential region of the tray, a partial ring underlying and supporting a circumferential region of the tray, a bracket underlying and supporting a circumferential region of the tray, a flange underlying and supporting a circumferential region of the tray, a cross beam underlying and supporting a chordal region of the tray; and a tray panel forming a cross beam supporting a portion of an adjacent tray panel or panels of the tray;
    a plurality of support-area-aeration apertures are formed in the tray laterally adjacent to the tray support;
    one or more of the plurality of support-area-aeration apertures are at least partially covered by a cover, said cover positioned to interact with vapor passing through the support-area-aeration aperture such that greater than 50% of vapor passing through the support-area-aeration aperture is directed laterally across the tray and over an underlying tray support.

2. The apparatus of claim 1, wherein the height of the cover with respect to the tray deck is variable depending upon vapor flow rate through the support-area-aeration aperture, liquid level on the tray, or both vapor flow rate through the support-area-aeration aperture and liquid level on the tray.

3. The apparatus of claim 1, wherein the cover comprises a canopy disposed above the tray and at least partially covering the support-area-aeration aperture, said canopy being connected to one or more legs disposed through the support-area-aeration aperture, and said one or more legs being provided with one or more feet disposed under the tray, wherein said feet interact with the underside of the tray to prevent removal of the cover from the tray.

4. The apparatus of claim 3, wherein the legs are:
    vertically movable within the support-area-aeration aperture to allow variation of the height of the canopy from the tray deck, and
    tapered or rockered between the feet and canopy to allow the canopy to tilt with respect to the tray deck as the legs move within the aperture.

* * * * *